United States Patent
Kim

(10) Patent No.: US 7,251,477 B2
(45) Date of Patent: Jul. 31, 2007

(54) METHOD FOR STORING AND REPRODUCING A VOICE MESSAGE IN A MOBILE TELEPHONE

(75) Inventor: Ki-Hwan Kim, Yongin-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/018,776

(22) Filed: Dec. 20, 2004

(65) Prior Publication Data

US 2005/0105700 A1 May 19, 2005

Related U.S. Application Data

(63) Continuation of application No. 09/473,815, filed on Dec. 28, 1999, now Pat. No. 6,944,440.

(30) Foreign Application Priority Data

Dec. 30, 1998 (KR) .......................... 60744

(51) Int. Cl.
*H04L 12/58* (2006.01)

(52) U.S. Cl. .............................. 455/412.1; 379/88.22; 379/68

(58) Field of Classification Search ............ 379/88.22, 379/88.11, 68; 455/412, 413, 566, 433.06, 455/433.07, 412.1
See application file for complete search history.

(56) References Cited

U.S. PATENT DOCUMENTS

| | | | | |
|---|---|---|---|---|
| 4,688,117 A | * | 8/1987 | Dwyer et al. ............... 360/72.3 |
| 4,713,835 A | * | 12/1987 | Bond et al. ................... 379/79 |
| 4,821,311 A | * | 4/1989 | Hashimoto ............... 379/88.24 |
| 5,258,751 A | * | 11/1993 | DeLuca et al. ............ 340/7.52 |
| 5,455,579 A | * | 10/1995 | Bennett et al. ............. 341/110 |
| 5,461,665 A | * | 10/1995 | Shur et al. ................ 379/88.27 |
| 5,483,577 A | * | 1/1996 | Gulick ..................... 379/88.07 |
| 5,519,766 A | * | 5/1996 | Jones .......................... 379/74 |
| 5,555,536 A | * | 9/1996 | Rolf et al. ..................... 369/19 |
| 5,568,540 A | | 10/1996 | Greco et al. |
| 5,572,576 A | * | 11/1996 | Klausner et al. ......... 379/88.11 |
| 5,631,949 A | * | 5/1997 | Milton et al. ............... 379/88.2 |
| 5,717,742 A | | 2/1998 | Hyde-Thomson |
| 5,751,793 A | * | 5/1998 | Davies et al. ............ 379/88.11 |
| 5,768,349 A | * | 6/1998 | Knuth et al. ............. 379/88.22 |

(Continued)

*Primary Examiner*—Fan Tsang
*Assistant Examiner*—Olisa Anwah
(74) *Attorney, Agent, or Firm*—The Farrell Law Firm

(57) ABSTRACT

A method for managing voice messages in a mobile telephone, including a voice message store mode and a voice message reproduce mode. In the voice message store mode, the remaining memory capacity is calculated first, and, if there is sufficient memory, the voice message begins to be stored while the length of the currently storing voice message is displayed. At predetermined time intervals, the remaining memory capacity is calculated again and the displayed length is updated. If it is determined that there is insufficient memory capacity, a memory full message is displayed. When the voice message is completely stored, storage-related information is calculated and stored with the voice message. In the voice reproduce mode, the last stored message is found and then reproduced while the time remaining in the stored message is displayed. The time remaining is updated at predetermined time intervals. If scroll key input is detected, the next-to-last previous voice message is found and reproduced. When the reproduction is complete, the user may choose to listen to it again or listen to the next-to-last or next previous voice message.

5 Claims, 4 Drawing Sheets

U.S. PATENT DOCUMENTS

| | | | |
|---|---|---|---|
| 5,867,793 A * | 2/1999 | Davis | 455/556.1 |
| 6,021,181 A * | 2/2000 | Miner et al. | 379/88.23 |
| 6,038,199 A * | 3/2000 | Pawlowski et al. | 369/29.02 |
| 6,073,103 A * | 6/2000 | Dunn et al. | 704/276 |
| 6,169,911 B1 | 1/2001 | Wagner et al. | |
| 6,226,363 B1 * | 5/2001 | Miller | 379/88.27 |
| 6,226,533 B1 | 5/2001 | Akahane | |
| 6,301,608 B1 * | 10/2001 | Rochkind | 709/206 |
| 6,335,962 B1 * | 1/2002 | Ali et al. | 379/88.11 |
| 6,353,809 B2 * | 3/2002 | Takahashi et al. | 704/235 |
| 6,480,579 B2 * | 11/2002 | Hijii | 379/67.1 |
| 6,760,696 B1 * | 7/2004 | Goldberg et al. | 704/201 |
| 2004/0022137 A1 * | 2/2004 | Campbell et al. | 369/1 |
| 2004/0219941 A1 * | 11/2004 | Haaramo et al. | 455/519 |
| 2004/0247098 A1 * | 12/2004 | Valco et al. | 379/88.22 |

* cited by examiner

METHOD FOR STORING AND REPRODUCING A VOICE MESSAGE IN A MOBILE TELEPHONE

PRIORITY

This application is a continuation of application Ser. No. 09/473,815, and filed Dec. 28, 1999 now U.S. Pat. No. 6,944,440, and claims priority to an application entitled "Method for Storing and Reproducing Voice Message in Mobile Telephone" filed in the Korean Industrial Property Office on Dec. 30, 1998 and assigned Serial No. 98-60744, the contents of which are hereby incorporated by reference.

BACKGROUND OF THE INVENTION

1. Field of the Invention

The present invention relates generally to a method for managing a voice message in a mobile telephone, and in particular, to a method for storing a voice message in a memory and reproducing the voice message stored in the memory.

2. Description of the Related Art

The voice message function currently adopted in mobile telephones has several limitations in storing a voice message in a memory. For example, in the Samsung SDH-600 or SDH-800, the total length of all voice messages is limited to 2 minutes and the number of the voice messages is limited to 4, so that each voice message is 30 seconds in length. Therefore, the user must consider all these limitations when storing a voice message, which is annoying.

In addition, when the user desires to listen to a certain voice message stored in the memory, the user produces the intended voice message by selecting one of the labels associated with the stored voice messages, displayed on the display of the mobile telephone. However, it is difficult to accurately select a desired voice message using only the labels.

SUMMARY OF THE INVENTION

It is, therefore, an object of the present invention to provide a method for minimizing the limitations on a user when storing a voice message.

It is another object of the present invention to provide a method for enabling the user to determine whether to reproduce the whole voice message by reproducing some of the voice message.

In accordance with one aspect of the present invention, there is provided a method for storing a voice message in a mobile telephone having a memory for storing a voice message. The method comprises determining whether a voice message store mode is set by a user; calculating, if the voice message store mode is set, the remaining memory capacity; if the remaining memory capacity is sufficient to store the voice message, starting storing a voice message in the memory while simultaneously displaying the length of the stored voice message; after a predetermined time interval, calculating the remaining memory capacity again, and updating the displayed length of the stored amount of the voice message; if the remaining memory capacity is sufficient to store the voice message, determining whether storing the voice message is completed, and, if storing the voice message is not completed, returning to the third step; if the remaining memory capacity is insufficient, displaying a memory full message; and upon completion of storing the voice message, calculating storage-related information and storing the storage-related information in the memory as voice message storage information for the stored voice message.

In accordance with another aspect of the present invention, there is provided a method for reproducing a voice message in a mobile telephone having a memory for storing voice message storage-related information. The method comprises determining whether a voice message reproduce mode is set by a user; if the voice message reproduce mode is set, accessing the memory to find the last stored voice message by consulting the stored times of respective voice messages; reproducing the found voice message while simultaneously displaying the remaining time left in the voice message; after a predetermined time interval, updating the remaining time left being displayed, determining if a scroll key is input, and, if the scroll key is input, finding the next voice message and returning to the third step to reproduce the next voice message; if the scroll key is not input, determining whether the reproduction is complete; if the reproduction is complete, determining if the user wishes to hear the message again; if the user wishes to hear it again, returning to the third step, and, if not, determining whether it was the last message; and if it was the last message, ending the sequence, and, if not, finding the next phone message and returning to the third step.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
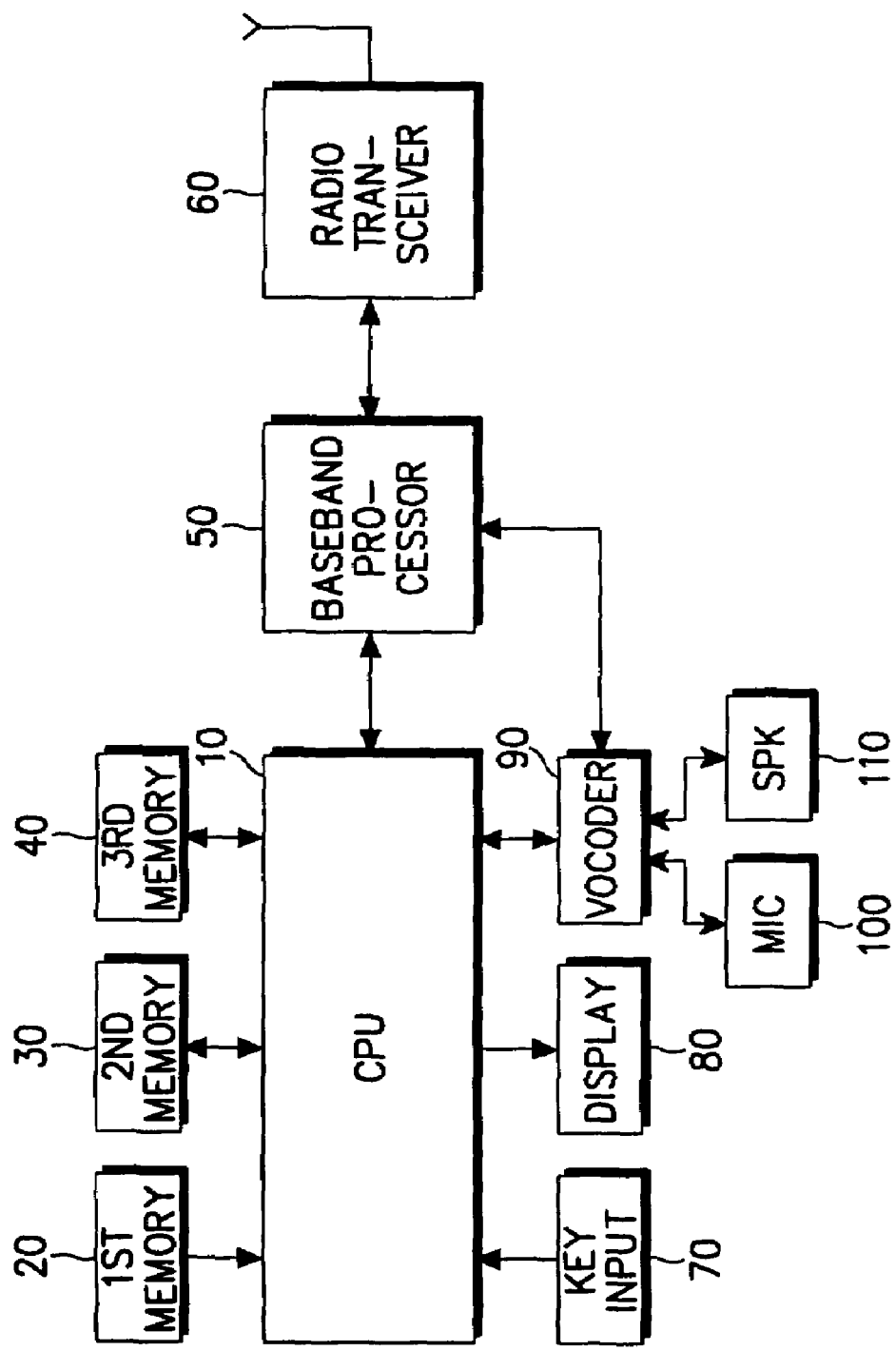
FIG. 1 is a block diagram illustrating a mobile telephone to which the present invention is applicable.

FIG. 1 shows a block diagram of a mobile telephone to which the present invention is applied. Referring to FIG. 1, a central processing unit (CPU) 10 calculates a remaining memory capacity, and controls the storing and reproducing of a voice message. A first memory 20, preferably a ROM (Read Only Memory), stores a control program and initial service data of the mobile telephone. A second memory 30, preferably a RAM (Random Access Memory), temporarily stores various data generated during operation of the mobile telephone. A third memory 40, a voice memory, stores various data required to manage the storage of voice messages. A baseband processor 50 processes a baseband signal. A radio transceiver 60 connected between the baseband processor 50 and an antenna, demodulates a radio signal received via the antenna and modulates a radio signal to be transmitted via the antenna. A key input unit 70 has various keys including those for the storing and reproducing of voice messages, such as a scroll key for proceeding to the next voice message. A display 80, an LCD (Liquid Crystal Display), displays the storing or reproducing state of the voice message, under the control of the CPU 10. A vocoder 90 processes a voice signal input from a microphone (MIC) 100 to provide the processed voice signal to the baseband processor 50, and provides a baseband signal from the baseband processor 50 to a speaker (SPK) 110. More specifically, the vocoder 90 converts an analog voice signal input from the microphone 100 to a digital PCM (Pulse Code Modulation) signal using an internal analog-to-digital converter, and then compresses the PCM signal into packet data. Preferably, the vocoder 90 uses 8 Kbps QCELP (Qualcomm Code Excited Linear Predictive coding) for a CDMA (Code Division Multiple Access) phone, or uses RPE-LTP (Regular Pulse Excitation with Long Term Prediction) for a GSM (Global System for Mobile communication) phone. The vocoder 90 provides the CPU 10 with the output packet data. The CPU 10 provides the third memory with the address where the output packet data is stored and the packet data output from the third memory is transmitted to the vocoder 90. Upon receipt of a reproduce command from the user, the CPU 10 reads the packet data corresponding to the address in the third memory 40, converts the read packet data to a PCM signal, and provides the converted PCM signal to a digital-to-analog converter in the vocoder 90. The digital-to-analog converter converts the input PCM signal to an analog signal, and then outputs it as an audible sound through the speaker 110.

Figure 2:
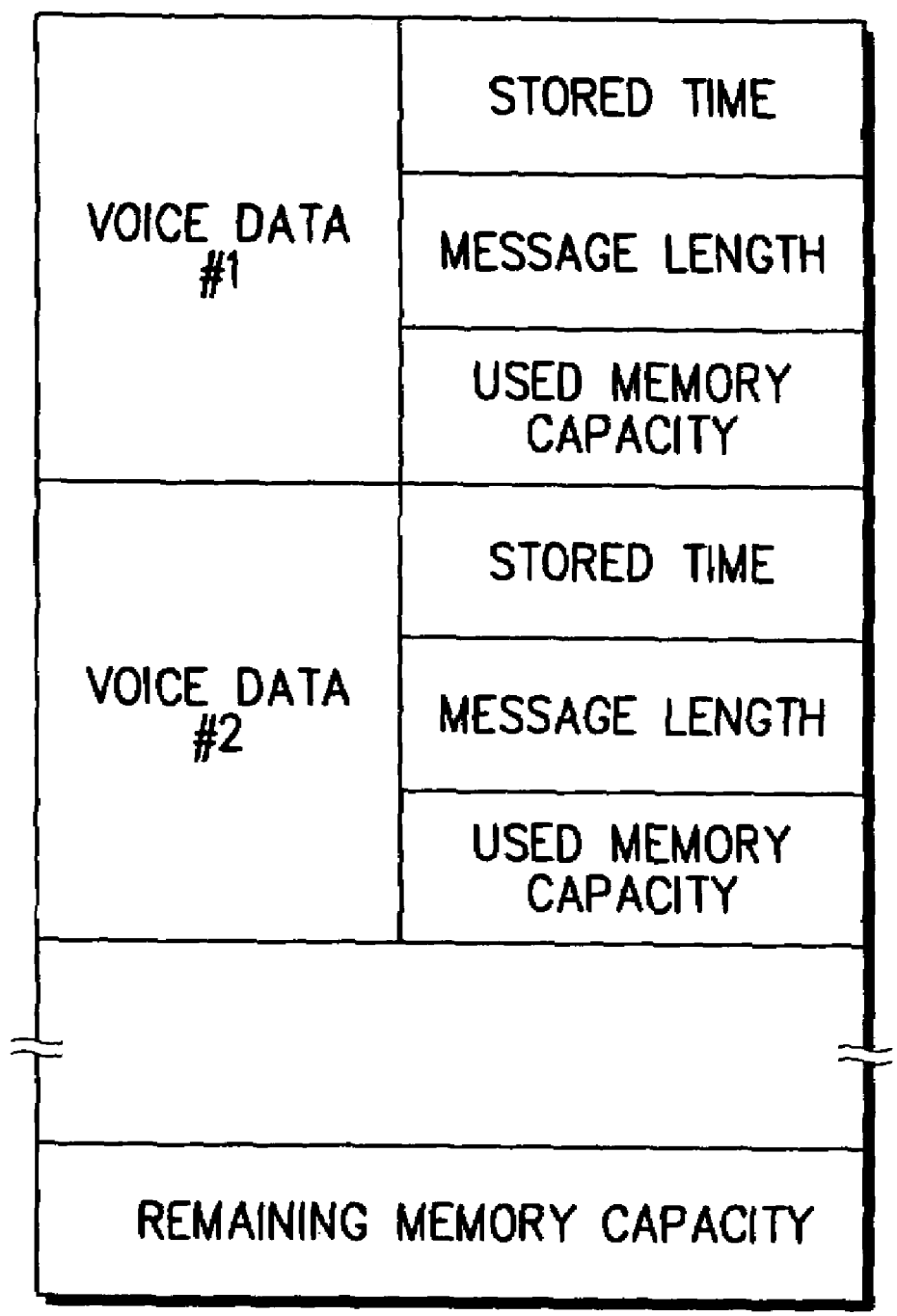
FIG. 2 is a diagram illustrating a map of a voice memory according to the preferred embodiment of the present invention.

FIG. 2 shows a map of the voice memory 40 of FIG. 1, according to the preferred embodiment of the present invention. A nonvolatile memory, such as an EEPROM (Electrically Erasable and Programmable Read Only Memory), can be used for the third memory 40. The third memory 40 includes several fields for storing voice data, the stored time of the voice message, the length of the stored voice message, the memory capacity used for storing the voice message, and the remaining memory capacity. The stored time of the message is the time at which the message was stored, and it is used to indicate the order of the voice messages.

Figure 3:
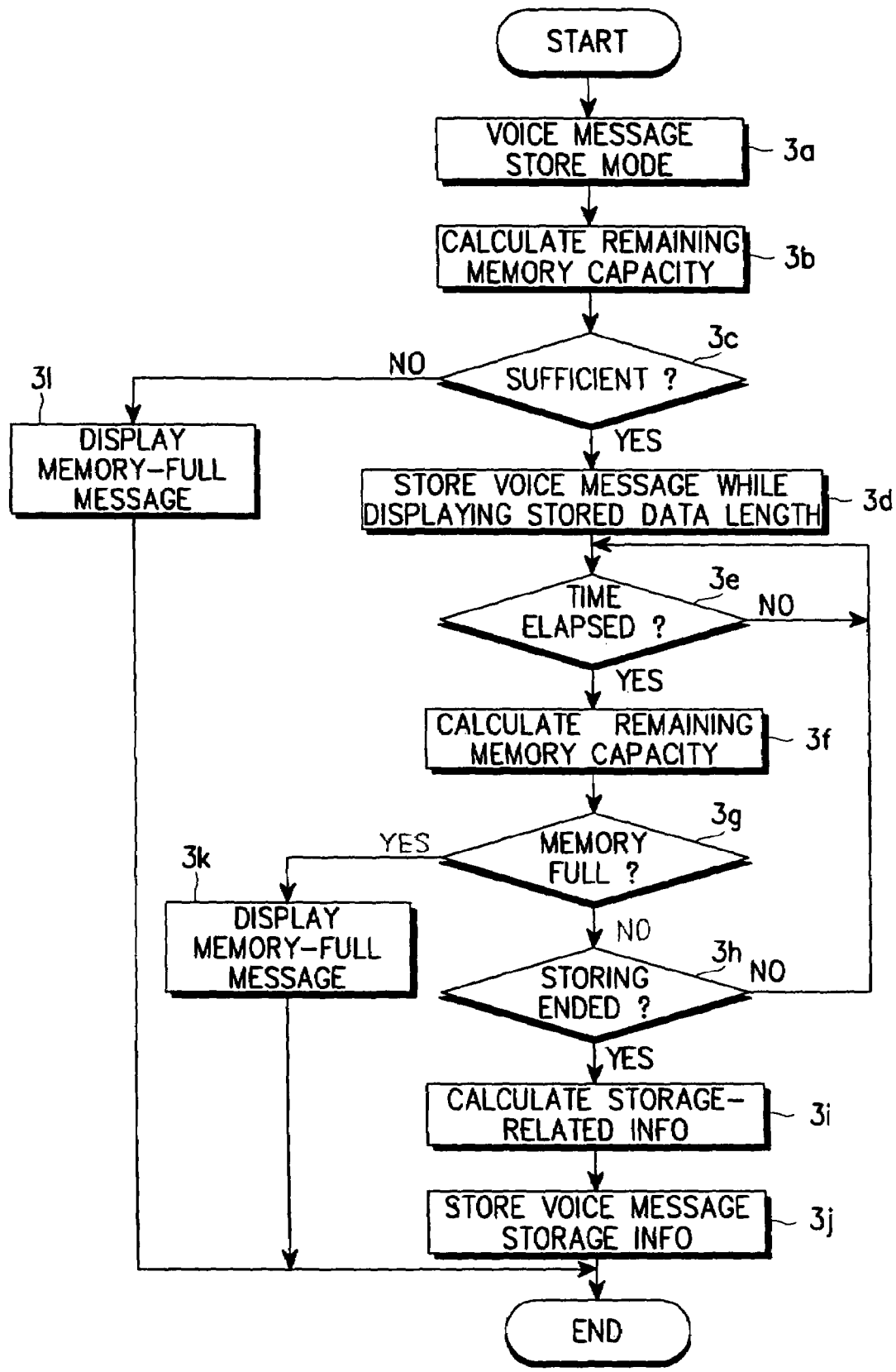
FIG. 3 is a flow chart illustrating a procedure for storing a voice message according to the preferred embodiment of the present invention.

FIG. 3 shows a procedure for storing a voice message according to the preferred embodiment of the present invention. The CPU 10 scans the key input unit 70 in step 3*a*, to determine whether the phone has been set to the voice message store mode by the user. If the voice message store mode is set, the CPU 10 calculates a remaining memory capacity by subtracting the used memory capacity from the total memory capacity, in step 3*b*.

In step 3*c*, the CPU 10 analyzes the calculation results to determine whether there is enough remaining memory capacity to store the voice message. If it is determined that the remaining memory capacity is insufficient to store the voice message, the CPU 10 displays a "memory-full" message on the display 80, in step 31.

However, if it is determined that the remaining memory capacity is sufficient to store the voice message, the CPU 10 starts storing the voice message in the third memory 40 while simultaneously displaying the length of the stored voice message on the display 80, in step 3*d*. In step 3*e*, the CPU 10 determines whether a predetermined time period, such as a second, has elapsed or not. When the predetermined time period has elapsed, the CPU 10 calculates the remaining memory capacity and updates the length of the stored voice message, being displayed on the display 80, in step 3*f*.

In step 3*g*, the CPU 10 analyzes the calculation results to determine whether there is enough remaining memory capacity. If the remaining memory capacity is insufficient, the CPU 10 displays a "memory-full" message on the display 80 in step 3*k*. Here, the length of the voice message is previously determined, for example, as 10 seconds. To increase the storing and reproducing efficiency, it is necessary to allocate a memory capacity of 10 seconds even when storing a voice message of 1 second. Therefore, when the remaining memory capacity is less than 10 seconds, it is necessary to inform the user of the memory-full state. Then, the user can either delete a previously stored message or quit storing the present voice message.

However, if the remaining memory capacity is sufficient, the CPU 10 determines in step 3*h* whether the voice message is completely stored. There are many ways the CPU 10 might determine if the phone message is complete. For example, the CPU 10 may determine that the phone message is complete when either the user presses a key indicating the end of the message or a predetermined time limit for message length runs out. If the voice message is not completed, the CPU 10 returns to the step 3*e*. However, if storing the voice message is complete, the CPU 10 calculates storage-related information in step 3*i*. The storage-related information includes the stored time of the voice message, the length of the stored voice message, and the memory capacity used for storing the voice message. Thereafter, the CPU 10 stores the calculated results in the third memory 40 as voice message storage information in step 3*j*.

Figure 4:
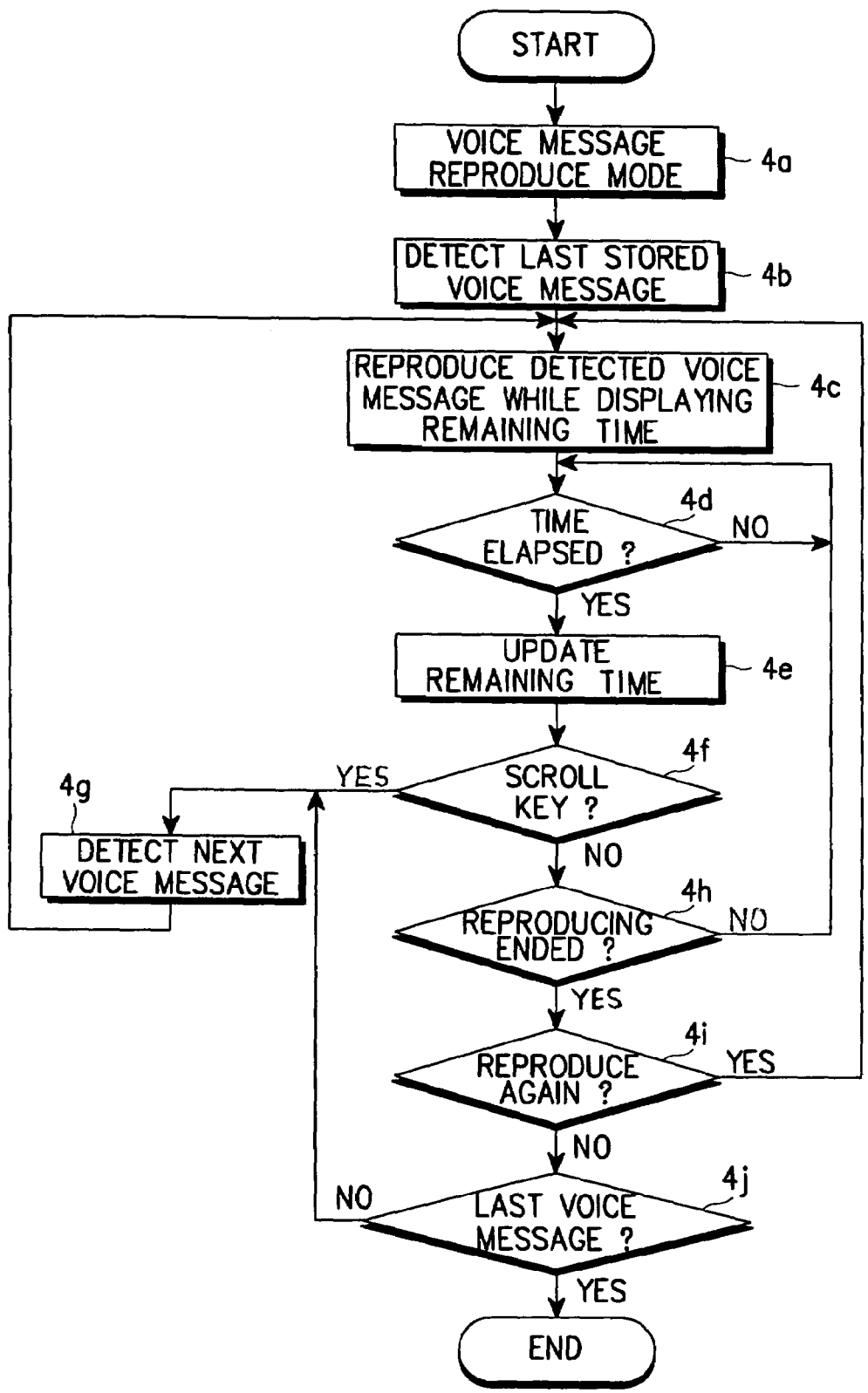
FIG. 4 is a flow chart illustrating a procedure for reproducing a voice message according to the preferred embodiment of the present invention.

FIG. 4 shows a procedure for reproducing a voice message according to the preferred embodiment of the present invention. The CPU 10 scans the key input unit 70 in step 4*a*, to determine whether the phone has been set to the voice message reproduce mode by the user. If the voice message reproduce mode is set, the CPU 10 accesses the third memory 40 to detect the last stored voice message by consulting the stored time of the respective voice messages, in step 4*b*. Thereafter, in step 4*c*, the CPU 10 starts reproducing the detected last voice message and simultaneously displays the remaining time left on the display 80. Subsequently, the CPU 10 determines in step 4*d* whether a predetermined time period has elapsed or not. When the predetermined time period has elapsed, the CPU 10 updates the remaining time left being displayed on the display 80, in step 4*e*. For example, when the length of the stored voice message is 30 seconds, the CPU 10 displays the remaining time left on a count-down basis, such as '30 seconds'→'29 seconds'→'28 seconds' . . . →'0 second'.

Thereafter, in step 4*f*, the CPU 10 scans the key input unit 70 to determine whether a scroll key is input or not. When the scroll key is input (or pressed), the CPU 10 accesses the third memory 40 to find the next voice message in step 4*g*, and returns to step 4*c* to reproduce the newly found voice message while displaying the remaining time left.

However, upon failure to detect the scroll key input in step 4*f*, the CPU 10 determines in step 4*h* whether reproduction of the voice message is completed or not. If reproduction is completed, the CPU 10 scans the key input unit 70 in step 4*i* to determine whether the user intends to listen to the voice message again. If the user intends to listen to the voice message again, the CPU 10 returns to step 4*c*. Otherwise, the CPU 10 determines in step 4*j* whether the reproduced voice message is the last voice message in memory. If the reproduced voice message is the last voice message, the CPU 10 ends the procedure. Otherwise, the CPU 10 proceeds to step 4*g* to find the next voice message stored in the third memory 40.

This method can also be used when deleting the voice messages.

In this manner, the user can store the increased number of voice messages without the various limitations in the prior art. In addition, when reproducing the voice messages, it is possible to detect a desired voice message more rapidly, without the need for text labels.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for reproducing a voice message in a mobile telephone having a memory for storing a voice message and storage-related information, the method comprising the steps of:
    (a) determining whether a voice message reproduce mode is set by a user;
    (b) after and in response to determining that the voice message mode is set by the user, accessing stored times of respective voice messages, comparing the stored times, and finding, based on the comparison, the last stored voice message;
    (c) reproducing the found voice message while simultaneously displaying a remaining time left in the found voice message;
    (d) after a predetermined time interval, updating the remaining time being displayed;
    (e) determining whether a scroll key is input while reproducing the found voice message; and
    (f) finding a next voice message and returning to step (c) to reproduce the next voice message, if the scroll key is input, wherein the message is reproduced without entering a key separate from the scroll key.

2. The method as claimed in claim 1, wherein the remaining time is displayed on a count-down basis.

3. The method as claimed in claim 1, further comprising the steps of:
    (g) upon failure to detect the scroll key input, determining whether reproducing is completed;
    (h) upon completion of reproducing, determining whether the user intends to listen to the voice message again;
    (i) returning to step
    (c) if the user intends to listen to the voice message again, and if not, determining whether the reproduced voice message is a last voice message;
    (j) ending the reproducing operation if the reproduced voice message is the last voice message; and
    (k) finding a next voice message and returning to step (c) to reproduce the next voice message, if the reproduced voice message is not the last voice message.

4. The method as claimed in claim 1, wherein the step of comparing the stored times comprises the step of, after and in response to determining that the voice message mode is set by the user, comparing the stored times automatically without an additional user input.

5. The method as claimed in claim 4, wherein the step of reproducing the found voice message comprises the step of, after and in response to determining that the voice message mode is set by the user, reproducing the found voice message automatically without an additional user input.

* * * * *